Oct. 25, 1938. C. E. PINK Re. 20,897

MULTISTRAND SPIRAL FABRIC

Original Filed June 24, 1935

Clarence E. Pink
INVENTOR

BY Victor J. Evans & Co.
ATTORNEYS

Reissued Oct. 25, 1938

Re. 20,897

UNITED STATES PATENT OFFICE 20,897

MULTISTRAND SPIRAL FABRIC

Clarence E. Pink, Cambridge, Md.

Original No. 2,091,214, dated August 24, 1937, Serial No. 28,197, June 24, 1935. Application for reissue January 13, 1938, Serial No. 184,901

8 Claims. (Cl. 245—6)

The object of the invention is to provide a spiral fabric of the multi-strand form similar to that shown in Patent No. 1,833,260 of November 24, 1931, but in which there is a greater degree of flexibility than in the fabric of the patent; and to provide a fabric of the kind indicated in which closeness of weave is secured, comparatively great tensile strength and a simplicity of construction which makes for comparatively cheap manufacture.

With this object in view, the invention consists in a construction and combination of parts, of which a preferred embodiment is illustrated in the accompanying drawing, wherein.

The improved fabric is made up of a plurality of coupled sections 10, of which each is composed of a plurality of spiral strands, as, for example, the strands 11 and 12, and a cross rod 14. The strands comprised in any one section may be two or more in number, and the strands are wound so that successive convolutions are pitched at a comparatively great distance apart. This arrangement provides for threading the one strand into the other, so that the convolutions of assembled strands are arranged in intercurrent relation and the pitch of the convolutions of an assembled section reduced to one-half, one-third and so forth of the pitch of a single strand, depending on how many strands are comprised in a section. The extremities of the assembled strands are secured to the extremities of the cross rod 14, as indicated at 15, in any acceptable manner, as by welding and the like.

Figure 1:
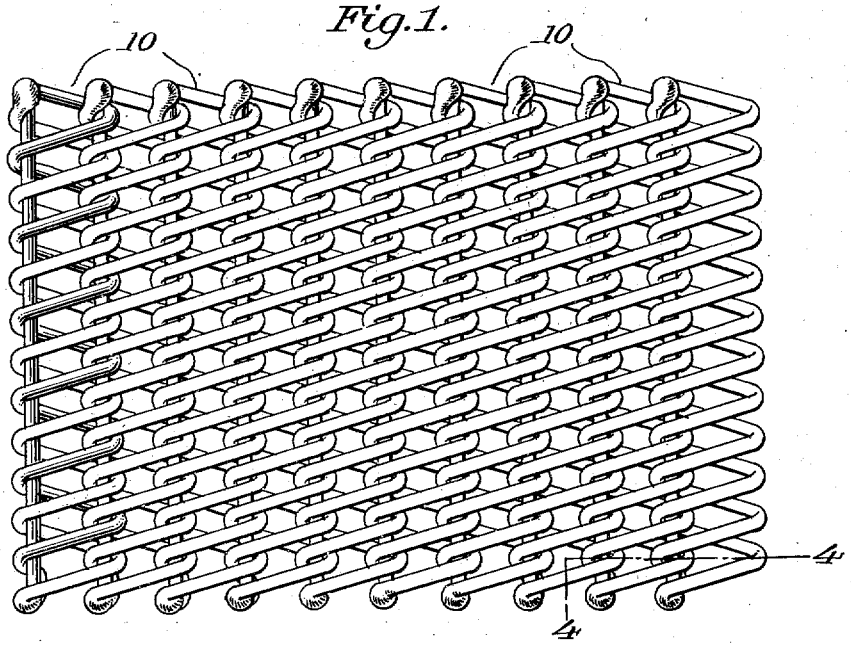
Figure 1 is a plan view of the fabric constructed in accordance with the invention.
Figure 2:
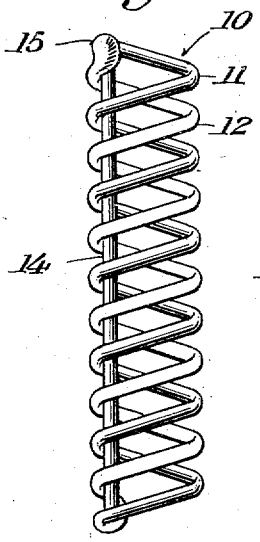
Figure 2 is a similar view of one of the fabric sections.
Figure 3:
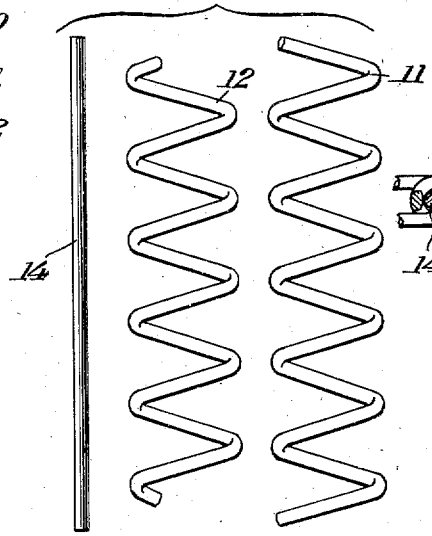
Figure 3 is a collective plan view of the several elements comprising a section.
Figure 4:
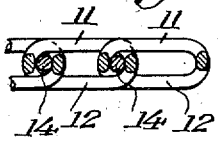
Figure 4 is a sectional view on the plane indicated by the line 4—4 of Figure 1.

The strands 11 and 12 are so wound as to make the convolutions of generally oval form, as illustrated in Figure 4, the major axes of the convolutions being disposed in the direction of the length of the woven fabric. The cross rods 14 thus lie in the ends of the loops formed by the convolutions of the strands, the cross rod of any section being engaged freely with the loops of the convolutions of an adjacent section.

In the weaving of the fabric, the convolutions of the strands 12 of each section are looped together and the strands 11 of the several sections are similarly connected, the cross rods being inserted through the sections between the loops of connected convolutions, so that they provide the axes on which the sections swing relative to each other. While each cross rod is rigidly connected to the strands of the section in which it is comprised, it nevertheless provides the swinging connection for the next adjacent section.

Since the several sections thus may readily swing relative to each other, a high degree of flexibility in the fabric is provided with the close mesh that it is possible to secure with comparatively coarse wire from this particular arrangement of weaving.

The invention having been described, what is claimed as new and useful is:

1. A spiral fabric comprising connected sections of which each includes a plurality of spiral strands threaded one into the other and a cross rod inserted through the convolutions of the strands in contact with the inner peripheries thereof at one point, the cross rods of each section being terminally secured to the extremities of the strands of that section, the convolutions of the strands of one section being interlooped with the convolutions of the strands of the adjacent section but around the cross rod thereof.

2. A spiral fabric comprising connected sections of which each includes a plurality of spiral strands threaded one into the other, the convolutions of the strands being of generally oval form, a cross rod inserted through the convolutions of the strands in contact with the inner peripheries thereof at one end of the major axes of the convolutions, the cross rods of each section being terminally secured to the extremities of the strands of that section, the convolutions of the strands of one section being interlooped with the convolutions of the strands of the adjacent section but around the cross rods thereof.

3. A spiral fabric comprising spiral strands having their convolutions comparatively widely spaced, one strand being threaded into the other to dispose its convolutions in intercurrent relation with the convolutions of the first, the extremities of the threadedly related strands being secured together and adjacent strands having their convolutions interlooped, and cross rods embraced by the interlooped convolutions and terminally secured marginally to the fabric.

4. A spiral fabric comprising spiral strands having their convolutions comparatively widely spaced, one strand being threaded into the other to dispose its convolutions in intercurrent relation with the convolutions of the first, and cross rods extending through the convolutions of the threadedly related strands and terminally secured to the extremities of the latter, adjacent strands having their convolutions interlooped around the cross rods.

5. A spiral fabric composed of a plurality of sections of which each comprises spiral strands having their convolutions comparatively widely spaced, one strand being threaded into the other to dispose its convolutions in intercurrent relation with the convolutions of the first, and cross rods embraced by adjacent strands and terminally secured to the extremities of the threadedly related strands, the extremities of said threadedly related strands being secured together.

6. A spiral fabric composed of a plurality of sections of which each comprises spiral strands having their convolutions comparatively widely spaced, one strand being threaded into the other to dispose its convolutions in intercurrent relation with the convolutions of the first, and cross rods extending through the convolutions of the threadedly related strands and terminally secured to the extremities of the latter.

7. A spiral fabric embodying sections which comprise spiral strands having their convolutions comparatively widely spaced, one strand being threaded into the other to dispose its convolutions in intercurrent relation with convolutions of the first, and cross rods extending through the convolutions of the threadedly related strands and fixedly secured to the latter.

8. A spiral fabric embodying sections which comprise spiral strands having their convolutions comparatively widely spaced, one strand being threaded into the other to dispose its convolutions in intercurrent relation with convolutions of the first, and cross rods coupling pairs of threadedly related strands laterally, the cross rods being terminally united with the extremities of the threadedly related strands.

CLARENCE E. PINK.